United States Patent
Cordonier et al.

(10) Patent No.: US 7,993,753 B2
(45) Date of Patent: Aug. 9, 2011

(54) COATING LIQUID, TITANIUM OXIDE FILM FORMED BY COATING LIQUID, AND FORMING METHOD THEREOF

(75) Inventors: Christopher Cordonier, Aichi (JP); Tetsuya Shichi, Aichi (JP); Takafumi Numata, Aichi (JP); Kenichi Katsumata, Aichi (JP); Akimasa Nakamura, Aichi (JP); Yasuhiro Katsumata, Aichi (JP); Teruo Komine, Aichi (JP); Kenichirou Amemiya, Aichi (JP); Akira Fujishima, Aichi (JP)

(73) Assignee: Central Japan Railway Company, Aichi (JP)

( * ) Notice: Subject to any disclaimer, the term of this patent is extended or adjusted under 35 U.S.C. 154(b) by 260 days.

(21) Appl. No.: 12/226,826

(22) PCT Filed: Dec. 25, 2006

(86) PCT No.: PCT/JP2006/325783
§ 371 (c)(1),
(2), (4) Date: Oct. 29, 2008

(87) PCT Pub. No.: WO2008/007453
PCT Pub. Date: Jan. 17, 2008

(65) Prior Publication Data
US 2009/0075094 A1    Mar. 19, 2009

(30) Foreign Application Priority Data
Jul. 13, 2006    (JP) .................. 2006-193415

(51) Int. Cl.
*B32B 17/06*    (2006.01)
*B05D 3/02*    (2006.01)

(52) U.S. Cl. ........ 428/432; 428/697; 428/689; 428/701; 428/702; 427/226

(58) Field of Classification Search .................. 428/432, 428/697, 689, 701, 702; 427/226
See application file for complete search history.

(56) References Cited

U.S. PATENT DOCUMENTS
4,880,758 A * 11/1989 Heistand et al. ............. 501/137
(Continued)

FOREIGN PATENT DOCUMENTS
EP    0737513 A1    10/1996
(Continued)

OTHER PUBLICATIONS
Office Action in counterpart Korean Appln. No. 2008-7030715.
(Continued)

*Primary Examiner* — Gwendolyn Blackwell
(74) *Attorney, Agent, or Firm* — Kinney & Lange, P.A.

(57) ABSTRACT

The present invention provides a coating liquid including organic metal complexes represented by Chemical Formula 1.

[Formula 1]

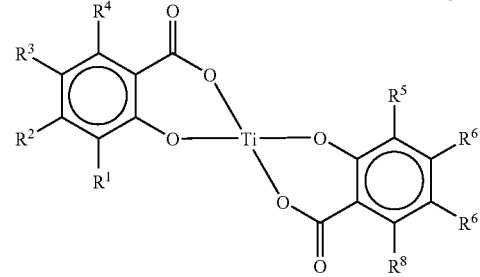

$R^1$-$R^8$ in Chemical Formula 1 is one of the followings (1)-(4):
(1) a group represented by $C_nH_{2n+1}$ (aforementioned n is an integral number equal to or larger than 0);
(2) a group represented by $COOR^9$ (aforementioned $R^9$ is a group represented by $C_mH_{2m+1}$, and aforementioned m is an integral number equal to or larger than 0);
(3) a halogen atom; and
(4) CN or $NO_2$.

8 Claims, 5 Drawing Sheets

TITANIUM-IMINODIETHANOL COMPLEX

+ 2 NH(CH$_2$CH$_2$OH)$_2$
2,2'-IMINODIETHANOL

TITANIUM ISOPROPOXIDE

+ 4 (CH$_3$)$_2$CHOH
2-PROPANOL

TITANIUM-IMINODIETHANOL COMPLEX

U.S. PATENT DOCUMENTS 6,169,119 B1 * 1/2001 Ryang et al. .............. 516/90
6,576,302 B1 6/2003 Mizuta et al.

FOREIGN PATENT DOCUMENTS

| | | |
|---|---|---|
| JP | 62105156 | 5/1987 |
| JP | 7100378 | 4/1995 |
| JP | 8160668 | 6/1996 |
| JP | 9278489 | 10/1997 |
| JP | 11228113 | 8/1999 |
| JP | 11256342 | 9/1999 |
| JP | 2000290533 | 10/2000 |
| JP | 2005181776 | 7/2005 |
| JP | 2005290369 | 10/2005 |
| KR | 0365663 | 2/2003 |
| KR | 0375359 | 3/2003 |

OTHER PUBLICATIONS

Office Action issued by the Korean Patent Office in foreign counterpart Application No. 2008-7030715 with partial translation, dated Feb. 10, 2011.

* cited by examiner

COATING LIQUID, TITANIUM OXIDE FILM FORMED BY COATING LIQUID, AND FORMING METHOD THEREOF

TECHNICAL FIELD

The present invention is related to a coating liquid used for forming a titanium oxide film, a titanium oxide film, a forming method thereof, and a product having a titanium oxide film formed on a surface of the product.

BACKGROUND ART

A titanium oxide-based photocatalyst absorbs near-ultraviolet, and exhibits a strong oxidative decomposition ability so as to oxidatively decompose and detoxify environmental contaminants, such as various organic substances and NOx. In a case wherein a base plate is coated with titanium oxide-based photocatalysts, upon exposure to light, the surface of the base plate exhibits a photo-induced ultra hydrophilic property, and becomes easily soluble in water, such that fouling on the surface of the base plate can be easily washed off by water. In other words, a titanium oxide-based photocatalyst has an ability to decompose fouling by the action of light, and an ability to facilitate a removal of fouling by water. Because of these abilities, titanium oxide-based photocatalysts have been put into practical use as self-cleaning materials which constantly keep surfaces clean.

The following methods are known as techniques for forming a film of titanium oxide-based photocatalysts on a base plate:

(i) a technique wherein suspension of micro particles of titanium oxide, including a suitable binder component, is coated, and dried so as to form a film (see Patent Document 1), (ii) a technique wherein titanium oxide sol, obtained by a sol-gel method, is coated and fired (see Patent Document 2), (iii) a technique wherein solution of an organic titanium compound is coated so as to form a film, and fired so as to produce a photocatalytic film (see Patent Document 3), (iv) a technique wherein a titanium compound, such as titanium peroxide, is coated and dried so as to form a film (see Document 4), (v) a technique wherein thin sheet micro particles of titanium oxide are coated and fired so as to form a photocatalytic film (see Patent Document 5), (vi) a technique wherein titanium oxide film is formed by a gas-phase method, such as sputtering (see Patent Document 6).

Patent Document 1: Unexamined Japanese Patent Publication No. 11-228113
Patent Document 2: Unexamined Japanese Patent Publication No. 11-256342
Patent Document 3: Unexamined Japanese Patent Publication No. 09-278489
Patent Document 4: Unexamined Japanese Patent Publication No. 07-100378
Patent Document 5: Unexamined Japanese Patent Publication No. 2005-290369
Patent Document 6: Unexamined Japanese Patent Publication No. 2000-290533

DISCLOSURE OF THE INVENTION

Problems to be Solved by the Invention

In the above-described technique (i), the adhesion strength between a film and a base plate cannot be increased. Therefore, the durability of a film is not sufficient.

In the above-described technique (ii), since the progress of a condensation polymerization reaction is remarkably different depending on a temperature and humidity, constantly obtaining uniform films is difficult. Moreover, since the sol of a coating liquid is often unstable, there are many problems in an actual use, and some design is needed in order to maintain the viscosity of the sol and to prevent sedimentation of solid particles. Furthermore, in the method wherein particles of titanium oxide are fixed by sol, since a binder component including silicone, which is normally used in this method, does not have a photocatalytic activity, the photocatalytic activity in the entire film is reduced. There is also a problem in that, since contaminant is easily absorbed to the binder component, the initial anti-stain and anti-fouling properties are low.

In the above-described technique (iii), since the volume of the organic portion of a ligand in a film is large before firing, when the film is fired in order to produce metallic oxide, significant volume contraction of the film is caused. Thus, there are problems in that adhesion between the film and a base plate becomes deteriorated and exfoliation is caused, and in that, even when the film is adhered to a base plate, a number of cracks are formed in the film. The problems regarding cracks and the adhesion become significant especially when a thick film is made.

In the above-described technique (iv), since amorphous titanium oxide does not have photocatalytic performance, amorphous titanium oxide needs to be crystallized by heating. However, since crystals obtained by the crystallization are particulate, the adhesion between a film and a base plate is lost and exfoliation and the like are caused. Although an alternative method can be used wherein a film of titanium sol peroxide supports particles having photocatalytic performance, and the particles are fixed by drying, increasing the hardness and the strength of adhesion of the film is difficult in this method.

In the above-described technique (v), there are a number of processes until suspension of thin sheet titanium oxide is obtained. Moreover, adjustment in the dispersibility and the wettability of a coating liquid, which are necessary so as to obtain a uniform film, is difficult. Furthermore, in a case wherein a film is formed on a base plate, such as soda-lime glass and the like, distortion of the glass and the like are possibly caused, if a coating liquid is applied on the base plate and fired at the temperature of 500° C. or higher, which is higher than the strain point and the annealing point of ordinary soda-lime glass.

In the above-described technique (vi), although high degree of vacuum (high vacuum, normally in the range of $10^{-4}$ Pa) is needed, maintaining such high vacuum becomes difficult as a device becomes larger. Therefore, application to a base plate having a large dimension is difficult. Moreover, a large quantity of energy is required so as to vaporize the materials, and an enormous quantity of energy is additionally required since there are many cases wherein base plates, on which films are formed, are also heated so as to improve the quality of film formation. Furthermore, in a case wherein a base plate has a complex shape, film formation is difficult in a "shadow" portion of the base plate. Still furthermore, CVD involves chemical reaction, which makes difficult to maintain uniform composition of a film and requires control of by-products. Therefore, extremely complicated control is required.

When application of photocatalysts to glass is considered, although photocatalytic glass is commercially available for building materials, photocatalytic glass for vehicles, such as for automobiles, trains, and so on, does not exist except for relatively small dimensioned products, such as photocatalytic mirrors. This is because, as described above, photocatalytic films formed by conventional techniques do not have sufficient durability, and, therefore, such films cannot endure friction caused by washing brushes and the like which are regularly used for cleaning vehicles.

The present invention is made in consideration of the above issues. The purpose is to provide a coating liquid by which titanium oxide films can be easily formed, at lower firing temperature where cracks or poor adhesion are not caused in obtained titanium oxide films, and obtained titanium oxide films exhibit excellent anti-stain and anti-fouling properties. The purpose is also to provide a method for forming such titanium oxide film, a titanium oxide film, and a product covered by such titanium oxide film.

Means for Solving the Problem

A first invention of the present application is related to a coating liquid including organic metal complexes represented by Chemical Formula 1.

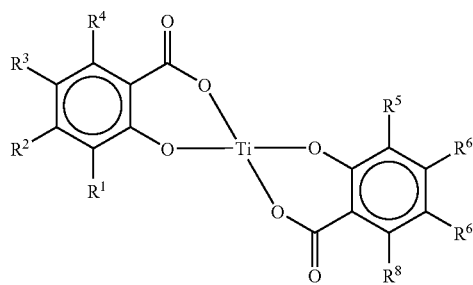

[Formula 1]

Each of $R^1$-$R^8$ in Chemical Formula 1 is one of the followings (1)-(4):
(1) a group represented by $C_nH_{2n+1}$ (aforementioned n is an integral number equal to or larger than 0),
(2) a group represented by $COOR^9$ (aforementioned $R^9$ is a group represented by $C_mH_{2m+1}$, and aforementioned m is an integral number equal to or larger than 0),
(3) a halogen atom, and
(4) CN or $NO_2$.

By using the coating liquid according to the present invention, a titanium oxide film can be formed on a surface of a base plate. For example, when the coating liquid according to the present invention is applied on a surface of a base plate and dried, a film including organic metal complexes is formed on the surface of the base plate. Subsequently, when the film is fired, the above-described organic metal complexes are decomposed by heat, ligands are lost, and a film made of titanium oxide is formed.

A titanium oxide film formed by using the coating liquid according to the present invention does not have cracks formed thereon, and has an excellent adhesion to a base plate. Moreover, because cracks are not formed, the thickness of a titanium oxide film can be increased.

The reason why cracks are not formed as described above can be assumed as follows. That is, the organic metal complex has a flat structure as clear from the molecular structure represented in Chemical Formula 1. Thus, when the coating liquid is applied on a base plate and a film is formed, due to an interaction among the organic metal complex molecules, a molecular assembly (stacking) is formed such that the organic metal complexes are overlapped with one another. Moreover, an interaction among aromatic rings included in the ligands contributes to the formation of the above-described molecular assembly. Therefore, even if the ligands are lost during firing, contraction in the volume in a direction parallel to the surface of a base plate is assumed to be inhibited, and occurrence of cracks and exfoliation is therefore assumed to be inhibited.

The reason why cracks and poor adhesion are caused when a metallic oxide film is formed by conventionally used organic metal complexes can be considered as follows. When a metallic atom forms a complex, bonds are formed through an outmost d-orbit. The bonds extend toward respective vertexes of a regular octahedron, wherein the metallic atom is positioned in the center, and a substitution group of the ligand exists on each of leading edges of the bond. Thus, an ordinary organic metal complex has a three-dimensional structure having a metal in the center, such as the molecule structure shown in FIG. 5. Consequently, when a film, made of organic metal complexes, is fired, and the ligands are lost by heat decomposition, a large contraction in the volume in three-dimensional space is caused. As a result, cracks and exfoliation are caused due to loss of matching in the size of a base plate and the size of a film.

Moreover, a titanium oxide film formed by using the coating liquid according to the present invention has a high degree of hardness. Furthermore, a titanium oxide film formed by using the coating liquid according to the present invention is flat, smooth, and has high transparency. Therefore, in a case, for example, wherein a titanium oxide film is formed on the surface of glass, the transparency of the glass can be maintained. In a case wherein a titanium oxide film is formed on the surface of a mirror, the reflectivity of the mirror can be maintained.

Furthermore, the coating liquid according to the present invention can form a titanium oxide film having durability even though the coating liquid does not contain a binder. Since the concentration of titanium oxide, contained in the formed film, is not diluted by a binder, the effect of titanium oxide (for example, photocatalytic effect in the wavelength range of ultraviolet radiation) is high.

Still furthermore, since the coating liquid according to the present invention is stable, the coating liquid can be preserved for a long term.

The organic metal complex represented in the above-described Chemical Formula 1 may be, for example, a titan-salicylic acid complex. The titan-salicylic acid complex is a chemical compound wherein $R^1$-$R^8$ in Chemical Formula 1 are all H.

The coating liquid according to the present invention can be easily produced. For example, the coating liquid can be made merely by adding, in a suitable solvent, two molar equivalent of an ingredient, which becomes a ligand, to basic ingredients, such as metal alkoxide, metal chloride, and so on, heating the ingredients so as to produce organic metal complexes, and performing filtering/recovering if necessary. In producing organic metal complexes, the ingredient which becomes the ligand is, for example, a compound represented Chemical Formula 2.

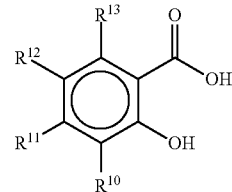

[Formula 2]

Each of $R^{10}$-$R^{13}$ in Chemical Formula 2 is one of the followings (1)-(4):

(1) a group represented by $C_nH_{2n+1}$ (aforementioned n is an integral number equal to or larger than 0),
(2) a group represented by $COOR^9$ (aforementioned $R^9$ is a group represented by $C_mH_{2m+1}$, and aforementioned m is an integral number equal to or larger than 0),
(3) a halogen atom, and
(4) CN or $NO_2$.

One of the compounds represented by Chemical Formula 2 is, for example, salicylic acid. Salicylic acid is a compound wherein $R^{10}$-$R^{13}$ in Chemical Formula 2 are all H.

For the solvent constituting the coating liquid according to the present invention, one type of mixture or two or more types of mixtures selected from a group of, for example, alcohol (such as 2-propanol, methanol, ethanol, n-butanol), ether (such as diethyl ether, MTBE, THF, and so on), hydrocarbon (such as octane, n-hexane, cyclohexane, benzene, toluene, xylene, and so on), dimethylsulfoxide, dimethylformamide, halide (chloroform, dibromomethane, dichloromethane, and so on), ketone (acetone, methyl ethyl ketone (MEK), AcAc, and so on), acetic ethyl, and water can be used.

Although the concentration of organic metal complexes in the coating liquid is not specifically limited, as long as the concentration does not exceed the solubility of organic metal complexes, the concentration is preferably, for example, 0.01-10% by weight.

n in the group represented by the above-described $C_nH_{2n+1}$ is preferable to be equal to or smaller than 10, more preferable to be equal to or smaller than 5, and particularly preferable to be equal to or smaller than 2. m in the above-described $R^9$=$C_mH_{2m+1}$ is preferable to be equal to or smaller than 4, more preferable to be equal to or smaller than 2, and particularly preferable to be equal to or smaller than 1. The group represented by $COOR^9$ preferably exits in $R^2, R^3, R^6, R^7, R^{11}$, or $R^{12}$. For the halogen atom, Cl, Br, I, for example, can be used.

A second invention of the present application is related to a method for forming a titanium oxide film including steps of applying the coating liquid, according to the above-described first invention, on a base plate so as to form a film, and changing the organic metal complex, included in the film, into titanium oxide.

A titanium oxide film formed according to the present invention does not have cracks formed thereon, and has an excellent adhesion to a base plate. Moreover, because cracks are not formed as described above, the thickness of a titanium oxide film can be increased.

Moreover, a titanium oxide film formed according to the present invention is flat, smooth, and has high transparency. Therefore, in a case, for example, wherein a titanium oxide film is formed on the surface of glass, the transparency of the glass can be maintained. In a case wherein a titanium oxide film is formed on the surface of a mirror, the reflectivity of the mirror can be maintained.

Furthermore, the coating liquid used in the present invention can form a titanium oxide film having durability even though the coating liquid does not contain a binder. Since the concentration of titanium oxide, contained in the formed film, is not diluted by a binder, the effect of titanium oxide (for example, photocatalytic effect in the wavelength range of ultraviolet radiation) is high.

For the aforementioned base plate, for example, glass (PYREX (registered trademark) glass, soda glass, quartz glass) can be used. Even in a case wherein a firing method is used during the process, in which organic metal complexes are changed into titanium oxide, distortion of glass and the like are less likely to be caused, since the firing temperature may be lower than the strain point and the annealing point of glass (soda-lime glass in particular).

Additionally, for the aforementioned base plate, metal (such as iron, stainless steel, aluminum, copper, brass and so on), ceramics (such as alumina, zirconia, silica), and heat-resistant macromolecule of resin (such as polyimide resin and the like) can be used.

Various methods can be used for the application of the coating liquid, as long as films can be formed by that method. Generally used coating methods, for example, spin coat, dip coat, spray coat methods and so on, may be used. Subsequent to the application of the coating liquid, films are preferably naturally dried at normal temperatures and normal pressures. Then, firing of the films, for example, may be performed.

In order to change the above-described organic metal complexes into titanium oxide, there is a method, for example, wherein the coating liquid is applied and a formed film is fired. The firing temperature is preferable to be a temperature, for example, equal to or higher than 300° C. and equal to or lower than the melting point of a base plate on which the coating liquid is applied (the melting point of the base plate is preferably 300° C. or higher). The firing temperature may be in a range of 300-600° C. If the firing temperature is 300° C. or higher, the photocatalytic activity of a titanium oxide film becomes increased. If the firing temperature is 350° C. or higher, the hardness of a titanium oxide film becomes increased (for example, 9H or higher). If the firing temperature is 400° C. or higher, a film which is harder and denser (a film durable against a brush test to be described later) can be formed. As described above, since the firing temperature can be a low temperature in the range of 300° C. (or 350° C., 400° C.), a titanium oxide film can be formed on the surface of a base plate which is not resistant to heat. The firing temperature may be adjusted depending on a desired crystalline phase of a titanium oxide film. Firing time is sufficient to be 1 minute or longer, preferably 1 hour or longer.

A third invention of the present application is related to a titanium oxide film formed by the method for forming a titanium oxide film according to the above-described second invention.

A titanium oxide film according to the present invention does not have cracks formed thereon, has an excellent adhesion to a base plate, and has high degree of hardness. Moreover, the titanium oxide film according to the present invention is flat, smooth, and has high transparency. Therefore, in a case, for example, wherein the titanium oxide film is formed on the surface of glass, the transparency of the glass can be maintained. In a case wherein the titanium oxide film is formed on the surface of a mirror, the reflectivity of the mirror can be maintained. Furthermore, since the titanium oxide film according to the present invention does not have to contain a binder, the concentration of titanium oxide, contained in the formed film, is not diluted by a binder, and the effect of titanium oxide (for example, photocatalytic effect in the wavelength range of ultraviolet radiation) is high.

A fourth invention of the present application is related to a titanium oxide film covered product including a base plate, and a titanium oxide film formed on a surface of the base plate by the method for forming a titanium oxide film according to the above-described second invention.

In the titanium oxide film covered product according to the present invention, the titanium oxide film does not have cracks formed thereon, has an excellent adhesion to a base plate, and has high degree of hardness. Moreover, the titanium oxide film according to the present invention is flat, smooth, and has high transparency. Therefore, in a case, for example, wherein the titanium oxide film is formed on the surface of glass, the transparency of the glass can be maintained. In a case wherein the titanium oxide film is formed on the surface of a mirror, the reflectivity of the mirror can be maintained. Furthermore, since the titanium oxide film according to the present invention does not have to contain a binder, the concentration of titanium oxide, contained in the formed film, is not diluted by a binder, and the effect of titanium oxide (for example, photocatalytic effect in the wavelength range of ultraviolet radiation) is high.

For the aforementioned base plate, for example, glass (PYREX (registered trademark) glass, soda glass, quartz glass) can be used. Even in a case wherein a firing method is used during the process, in which organic metal complexes are changed into titanium oxide deformation of glass and the like are less likely to be caused, since the firing temperature may be lower than the strain point and the annealing point of glass (soda-lime glass in particular).

Additionally, for the aforementioned base plate, metal (such as iron, stainless steel, aluminum, copper, brass and so on), ceramics (such as alumina, zirconia, silica), and heat-resistant macromolecule of resin (such as polyimide resin and the like) can be used.

DETAILED DESCRIPTION OF PREFERRED EMBODIMENTS OF THE INVENTION

Figure 1:
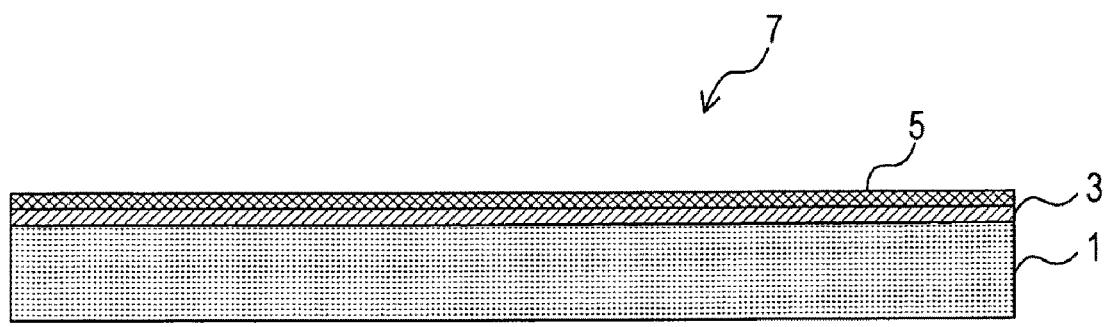
FIG. 1 is a sectional view showing a structure of a titanium oxide film covered product 7.

The present invention is described based on embodiments.

Embodiment 1

(a) Producing Coating Liquids

A solution was prepared wherein salicylic acid was dissolved in a suitable amount of xylene. To the solution, titanium(IV) isopropoxide (Titanium(IV) isopropoxide=TTIP) were added as much as the mol ratio of TTIP and salicylic acid became 1:2, and blended. The total amount of the solvent in the compound liquid was adjusted such that the concentration of TTIP became 0.5M (mol/L).

The above-described compound liquid was refluxed approximately for 1 hour, and then distilled until the amount of the compound liquid became half. While the compound liquid was distilled, the temperature of vapor became 140° C. After the distillation, residual mixture was left overnight at room temperature, and precipitate was formed therefrom and filtered by using a membrane suction filter. Subsequently, the filtered solid was placed in vacuum at 140° C. so as to remove volatile component, and dried. The drying was continued until the amount of the solid became a value (approximately 98%) close to a theoretical value. The obtained solid was titan-salicylic acid complexes.

Subsequently, the above-described titan-salicylic acid complexes were dissolved into 100 ml of compound liquid wherein acetylacetone and MEK (methyl ethyl ketone) were blended in the volume ratio of 1:9. Then, Coating Liquid A was completed. The concentration of titan-salicylic acid complexes in Coating Liquid A was determined to be 0.05M, or 0.01 wt %.

Additionally, in order to form a thick film, Coating Liquid B was made by dissolving the above-described titan-salicylic acid complexes in acetylacetone. The concentration of titan-salicylic acid complexes in Coating Liquid B was determined to be 0.5M, or 0.1 wt %.

(b) Forming Titanium Oxide Films on Surfaces of Glass Base Plates

On the surface of each base plate made of soda glass (melting point is approximately 1000° C.) in the size of 150 mm×75 mm, an undercoating layer (alkali barrier layer) was formed. The undercoating layer was formed by a method wherein a commercially available undercoating liquid (Bistrator H (NDH-500A) produced by Nippon Soda Co., Ltd.), which is a high-temperature type photocatalytic undercoating liquid, was applied on the surface of each base plate by a dip coat method, and then fired for 1 hour in atmospheric air. The lifting speed in the dip coat method was determined to be 8 mm/sec. Temperature control during firing was performed such that the temperature was increased from room temperature to 500° C. in 1 hour, maintained at 500° C. for 1 hour, and cooled down to room temperature in 1 hour.

Subsequently, Coating Liquid A produced in the above-described (a) was applied onto the surface of each glass base plate, on which the undercoating layer was formed, by the dip coat method. The lifting speed in the dip coat method was determined to be 8 mm/sec. Then, firing was performed at the firing temperatures shown in Table 1.

TABLE 1

| | Firing temperature (° C.) | Haze (%) | Color difference (ΔE) | Scratch test hardness |
|---|---|---|---|---|
| Embodiment 1 | 300 | 0.50 | 2.02 | <7H |
| | 325 | 0.39 | 1.48 | >9H |
| | 350 | 0.22 | 1.07 | >9H |
| | 375 | 0.21 | 0.98 | >9H |
| | 400 | 0.23 | 0.91 | >9H |
| | 425 | 0.47 | 1.00 | >9H |
| | 450 | 0.35 | 0.95 | >9H |
| | 475 | 0.20 | 1.02 | >9H |
| | 500 | 0.31 | 1.23 | >9H |
| | 525 | 0.39 | 0.93 | >9H |
| | 550 | 0.38 | 1.05 | >9H |
| | 575 | 0.41 | 0.80 | >9H |
| | 600 | 0.40 | 1.14 | >9H |
| Comparative Example 1 | — | — | — | <6H |

Temperature control during the firing was performed such that the temperature was increased from room temperature to a predetermined temperature in 1 hour, maintained at the predetermined temperature for 1 hour, and cooled down to room temperature in 1 hour.

According to the procedure described above, titanium oxide film covered products 7 were completed, each of which includes, as shown in FIG. 1, a titanium oxide ($TiO_2$) film 5 formed on a soda glass base plate 1 so as to interpose an undercoating layer 3.

(c) Evaluations of Haze, Color Difference, and Hardness

With regard to each of the titanium oxide film covered products 7 produced in the above-described (b), haze, color difference, and hardness of the titanium oxide film 5 were evaluated. Haze was measured based on JIS K 7136 by using NDH-500W produced by Nippon Denshoku Industries Co., Ltd. Color difference was measured based on JIS Z 8722 by using SE-2000 produced by Nippon Denshoku Industries Co., Ltd. Conditions for measuring hardness were conformed to Pencil Scratch Test (JIS K 5400).

Additionally, evaluations were made with respect also to a commercially available product (Cleartect produced by Nippon Sheet Glass Co., Ltd.) wherein films made of silicon and titanium oxide were formed on soda-lime glass by a sol-gel method (Comparative Example 1).

The measurement results of haze, color difference, and hardness of the titanium oxide films 5 are shown in the aforementioned Table 1. As shown in Table 1, in regard to the titanium oxide film covered products 7 according to Embodiment 1, haze values were small (transparency was high), color difference values were small, and hardness was high. Particularly, the higher the firing temperature was, the better the measurement results were in terms of color difference and hardness. On the other hand, in regard to Comparative Example 1, the hardness of the formed film was significantly low.

(d) Evaluation of Anti-Stain and Anti-Fouling Properties

With respect to each of the titanium oxide film covered products 7, which was produced in the above-described (b), the anti-stain and anti-fouling properties were evaluated. The evaluation method was as follows.

(i) Spectrum of each of the titanium oxide film covered products 7 after firing was measured by a spectrophotometer.

(ii) Each of the titanium oxide film covered products 7 was immersed into methylene blue solution whose concentration was 0.1 mM for 12 hours.

(iii) Spectrum of each of the titanium oxide film covered products 7 after the immersion was measured.

(iv) The area having absorbed methylene blue and represented by absorbance (abs.)×wavelength (nm) was given as an absorption amount.

The amount of absorbed methylene blue measured as above is shown in Table 2. "Firing temperature" shown in Table 2 is a temperature in which the titanium oxide film 5 was formed.

TABLE 2

|  | Firing temperature (° C.) | Amount of absorbed methylene blue |
|---|---|---|
| Embodiment 1 | 325 | 7.40 |
|  | 350 | 6.29 |
|  | 375 | 8.49 |
|  | 400 | 3.58 |
|  | 425 | 2.47 |
|  | 450 | 2.77 |
|  | 475 | 1.77 |
|  | 500 | 3.93 |
|  | 525 | 1.52 |
|  | 550 | 2.53 |
|  | 575 | 1.32 |
|  | 600 | 4.15 |

(e) Evaluation of Hydrophilic Property (Photocatalytic Action)

(i) A contact angle of water on the surface of the titanium oxide film 5 of each of the titanium oxide film covered products 7, which was formed according to the above-described (b), was measured. The measurement was performed before UV irradiation, and after 1-hour, 3-hour, and 6-hour UV irradiation. A 40 W-BLB lamp was used for a light source. The conditions for UV irradiation were such that the UV intensity on a tested surface became 2.4 mW/cm². The measurement results are shown in Table 3. "Firing temperature" shown in Table 3 is a temperature in which the titanium oxide film 5 was formed.

TABLE 3

|  |  | Contact angle (°) | | | |
|---|---|---|---|---|---|
|  | Firing Temperature (° C.) | Before UV irradiation | After 1-hour UV irradiation | After 3-hour UV irradiation | After 6-hour UV irradiation |
| Embodiment 1 | 325 | 53.5 | 45.3 | 37.9 | 41.1 |
|  | 350 | 78.7 | 58.2 | 35.9 | 28.5 |
|  | 375 | 91.0 | 60.5 | 33.5 | 18.9 |
|  | 400 | 82.2 | 37.4 | 4.0 | 3.1 |
|  | 425 | 65.6 | 4.2 | 4.9 | 0.0 |
|  | 450 | 27.9 | 13.2 | 3.3 | 0.0 |
|  | 475 | 53.5 | 23.7 | 2.8 | 0.0 |
|  | 500 | 36.9 | 3.5 | 3.1 | 0.0 |
|  | 525 | 38.3 | 0.0 | 0.0 | 0.0 |
|  | 550 | 33.2 | 0.0 | 0.0 | 0.0 |
|  | 575 | 17.2 | 4.3 | 0.0 | 0.0 |
|  | 600 | 14.3 | 0.0 | 0.0 | 0.0 |

As shown in Table 3, although all the contact angles before UV irradiation were 14° or larger, in a case wherein the firing temperature was 400° C. or higher when the titanium oxide film 5 was formed, the titanium oxide film covered product 7 became such hydrophilic that the contact angles became 10° or smaller after 6-hour UV irradiation. The result shows that the titanium oxide film 5 is optically induced to become super-hydrophilic.

(f) Evaluation of MB Degradation

The photocatalytic degradation activity so as to degrade organic matter, which is achieved by the titanium oxide films 5 of the titanium oxide film covered products 7 produced in the above-described (b), was evaluated based on "Test method for wet degradation performance" defined by Photocatalysis Industry Association of Japan. As Comparative Example 2, an evaluation was made with respect also to a base plate on which the titanium oxide film 5 was not formed. The evaluation results are shown in Table 4. "Firing temperature" shown in Table 4 is a temperature in which the titanium oxide film 5 was formed. The values shown in the column "Absorbance at 665 nm" are values relative to the initial concentration of methylene blue, which is 10. "No photocatalyst" indicates the base plate on which a titanium oxide film 5 is not formed (Comparative Example 2).

TABLE 4

|  | Firing temperature (° C.) | Absorbance at 665 nm |
|---|---|---|
| Embodiment 1 | 325 | 7.40 |
|  | 350 | 6.29 |
|  | 375 | 8.49 |
|  | 400 | 3.59 |
|  | 425 | 2.47 |
|  | 450 | 2.77 |
|  | 475 | 1.78 |
|  | 500 | 3.94 |
|  | 525 | 1.52 |
|  | 550 | 2.54 |
|  | 575 | 1.32 |
|  | 600 | 4.15 |
| Comparative Example 2 |  | 8.31 |

As shown in Table 4, the titanium oxide film covered products 7 showed particularly high MB degradation performances, when the firing temperature so as to form the titanium oxide film 5 was 400° C. or higher. This indicates that the photocatalytic property is particularly high when the firing temperature is 400° C. or higher. On the other hand, the base plate of Comparative Example 2 on which the titanium oxide film 5 was not formed ("no photocatalyst") showed a low MB degradation performance.

(g) Evaluation of Hardness by Brush Test

Figure 2:
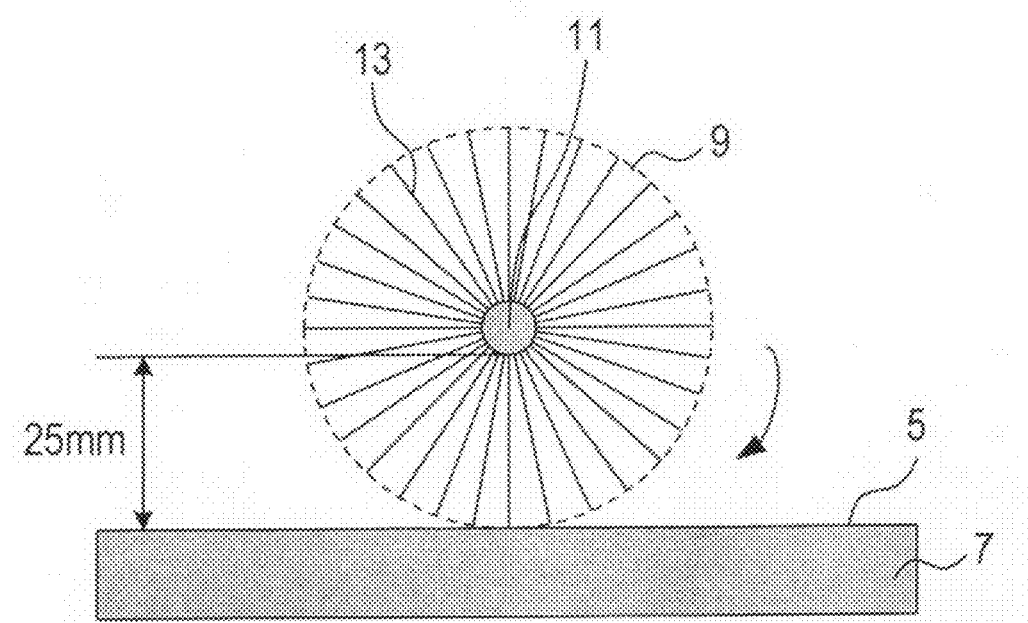
FIG. 2 is an explanatory view illustrating a method for a brush test.

As shown in FIG. 2, the surface of each of the titanium oxide film covered product 7 on which the titanium oxide film 5 was formed was rubbed by a brush 9. The brush 9 is a cylindrical brush for washing wherein horsehair 13 is radially attached around a rotational shaft 11. The length of the horsehair 13 is 35 mm. The brush 9 was attached such that the distance between the rotational shaft 11 and the titanium oxide film covered product 7 became 25 mm, and rotated at 500 rmp for 10 minutes.

Subsequently, contact angles were measured in the same manner as in the above-described (e). The result is shown in Table 5. "Firing temperature" shown in Table 5 is a temperature in which the titanium oxide film 5 was formed. In Table 5, contact angles measured in a case wherein brush abrasion was not performed are also shown.

Additionally, an evaluation was made with respect also to Comparative Examples 3-4 which are described below.

Comparative Example 3

(i) Preparation of Coating Liquid

Titania nano sheet (TNS) suspension having a concentration of 0.25 wt % was used as a coating liquid.

(ii) Forming Metallic Oxide Films on Surfaces of Glass Base Plates

On the surface of each soda glass base plate, an undercoating layer was formed. The type of the soda glass base plate and the undercoating layer are the same as in the above-described (b) in Embodiment 1. Subsequently, the coating liquid prepared in the above-described (i) was applied according to the dip coat method so as to form a film. The lifting speed in the dip coat method was determined to be 8 mm/sec. Then, firing was performed in the atmospheric air. Temperature control during the firing was performed such that the temperature was increased from room temperature to 500° C. in 1 hour, maintained at 500° C. for 1 hour, and cooled down to room temperature in 1 hour.

Comparative Example 4

Commercially available products (Layborg Hikari, produced by Nippon Sheet Glass Co., Ltd.) were used, each of which including a titanium oxide film formed on the surface of soda-lime glass by a sputtering method.

TABLE 5

| | Firing temperature (° C.) | Brush test | Contact angle (°) Before UV irradiation | After 6-hour UV irradiation |
|---|---|---|---|---|
| Embodiment 1 | 400 | Present | 83.4 | 3.9 |
| | | Absent | 82.2 | 3.1 |
| | 425 | Present | 78.8 | 2.7 |
| | | Absent | 65.6 | 0.0 |
| | 450 | Present | 69.0 | 0.0 |
| | | Absent | 27.9 | 0.0 |
| | 475 | Present | 70.4 | 0.0 |
| | | Absent | 53.5 | 0.0 |
| | 500 | Present | 76.7 | 3.3 |
| | | Absent | 36.9 | 0.0 |
| | 525 | Present | 66.3 | 4.5 |
| | | Absent | 38.3 | 0.0 |
| | 550 | Present | 69.5 | 4.5 |
| | | Absent | 33.2 | 0.0 |
| | 575 | Present | 36.9 | 6.7 |
| | | Absent | 17.2 | 0.0 |
| | 600 | Present | 45.3 | 4.2 |
| | | Absent | 14.3 | 0.0 |
| Comparative Example 3 | | Present | 31.6 | 22.8 |
| | | Absent | 23.1 | 4.9 |
| Comparative Example 4 | | Present | 45.0 | 22.2 |
| | | Absent | 34.2 | 0.0 |

As shown in Table 5, in a case wherein the titanium oxide film covered products 7 were fired at 400° C. or higher, the contact angles became extremely small after 6-hour UV irradiation, even though brush abrasion was performed. This indicates that if the firing temperature is 400° C. or higher, the hardness of the titanium oxide film 5 becomes even higher and is less likely to be worn away even if brush abrasion is performed. On the other hand, with respect to Comparative Examples 3-4, when brush abrasion was performed, the contact angles hardly became small despite the 6-hour UV irradiation. This means that, since the hardness of the photocatalytic films was low, the photocatalytic films were worn away by brush abrasion.

Embodiment 2

(a) Producing Titanium Oxide Film Covered Products

Firstly, on the surface of a soda glass base plate, an undercoating layer was formed. The type of the soda glass base plate and the undercoating layer are the same as the above-described (b) in Embodiment 1. Subsequently, Coating Liquid B prepared in the above-described (a) in Embodiment 1 was applied according to the dip coat method so as to form a film. The lifting speed in the dip coat method was determined to be 8 mm/sec. Then, firing was performed in the atmospheric air. Temperature control during the firing was performed such that the temperature was increased from room temperature to 500° C. in 1 hour, maintained at 500° C. for 1 hour, and cooled down to room temperature in 1 hour.

(b) Evaluations of Hardness, Haze, and Film Condition

With regard to the titanium oxide film covered product 7 produced in the above-described (a), hardness, haze, and the condition of the titanium oxide film were evaluated. Haze was measured according to the method for obtaining haze of plastic-transparent material (JIS K 7136). The conditions for measuring hardness were conformed to Pencil Scratch Test (JIS K 5400). Film condition was evaluated by visual observation, and if there is no crack and the like on the film, the condition was evaluated well.

Comparative Example 5 to be described below was also evaluated.

Comparative Example 5

On the surface of a soda glass base plate, an undercoating layer was formed. The type of the soda glass base plate and the undercoating layer are the same as the above-described (b) in Embodiment 1. Subsequently, a commercially available photocatalytic coating liquid (Bistrator H Photocatalytic coating NDH-510C produced by Nippon Soda Co., Ltd.), which was a sol-gel type coating liquid for high-temperature baking, was applied according to the dip coat method so as to form a film. The lifting speed in the dip coat method was determined to be 8 mm/sec. Then, firing was performed in the atmospheric air. Temperature control during firing was performed such that the temperature was increased from room temperature to 500° C. in 1 hour, maintained at 500° C. for 1 hour, and cooled down to room temperature in 1 hour.

The evaluation results in terms of hardness, haze, and film condition are shown in Table 6.

TABLE 6

|  | Pencil scratch test harness | Haze (%) | Film condition |
|---|---|---|---|
| Embodiment 2 | >9H | 0.35 | Good (no cracks) |
| Comparative Example 5 | <2H | 2.27 | Good (no cracks) |

As shown in Table 6, in regard to the titanium oxide film formed on the titanium oxide film covered product according to Embodiment 2, the hardness was high, the value for haze was small (transparency was high), and the film condition was good. On the other hand, in regard to Comparative Example 5, the hardness was significantly low, and the value of haze was high.

(c) Evaluation for Surface of Titanium Oxide Film by Microscope Observation

Figure 3:
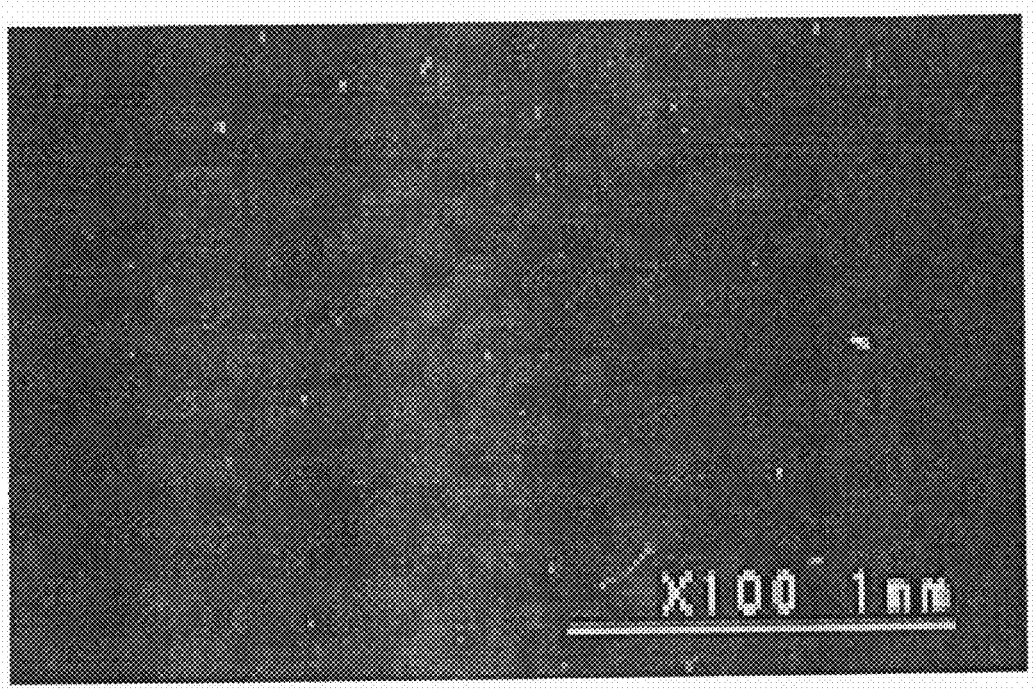
FIG. 3 is a micrograph showing a surface of a titanium oxide film.

The titanium oxide film of the titanium oxide film covered product produced in the above-described (a) was observed by a microscope. A micrograph taken during the observation is shown in FIG. 3. As shown in FIG. 3, no cracks were observed on the titanium oxide film.

Figure 4:
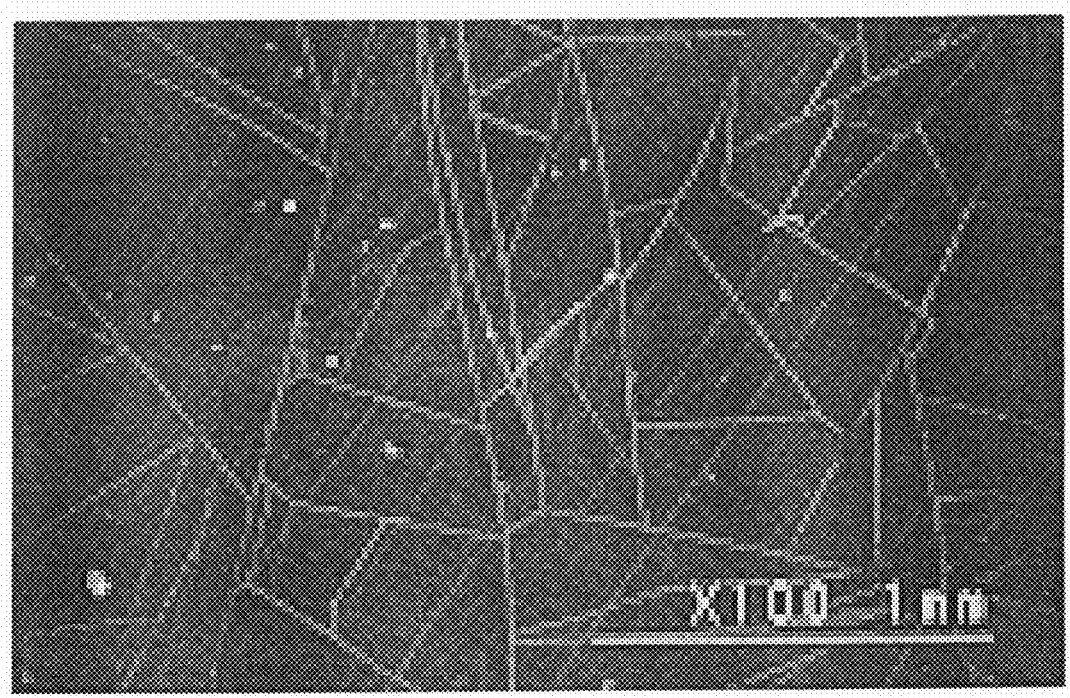
FIG. 4 is a micrograph showing a surface of a titanium oxide film.

The film formed in Comparative Example 6 to be described below was also observed. A micrograph taken during the observation is shown in FIG. 4. As shown in FIG. 4, a number of cracks were observed on the formed film.

Comparative Example 6

(i) Preparing Coating Liquid

Figure 5:
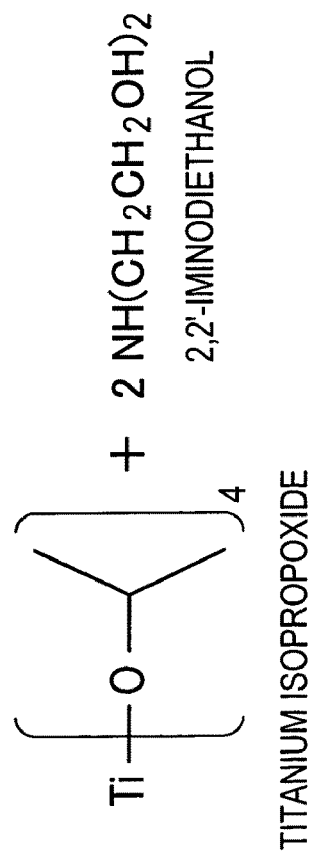
FIG. 5 is an explanatory view showing a molecular structure of a titanium-iminodiethanol complex.
Figure 5:
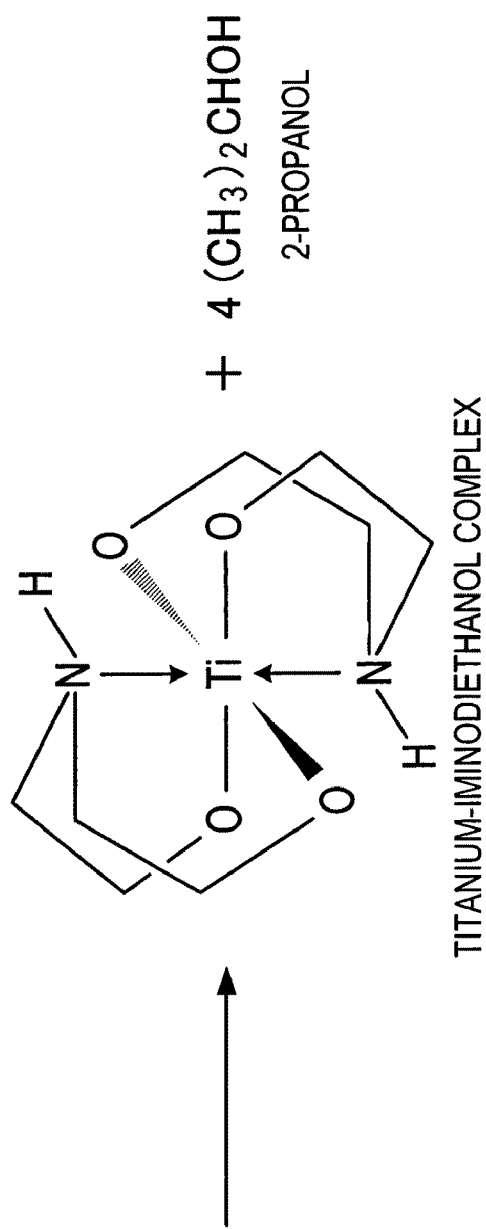

A solution was prepared wherein 2,2'-iminodiethanol (2,2'-iminodiethanol) was dissolved in a suitable amount of toluene. In the solution, TTIP was dropped so as to obtain a mixed solution. The mixed solution was prepared such that the mol ratio of TTIP and 2,2'-iminodiethanol became 1:2, and the total amount of the solvent in the mixed solution was adjusted such that the concentration of TTIP became 0.5M. The above-described mixed solution was refluxed approximately for 1 hour, and then distilled until the amount of the mixed solution became half. During distillation, the temperature of steam became 110° C. After the distillation, benzene was added as much as the amount of the above-described mixed solution so as to adjust the concentration of titanium to 0.1M, or 0.1 wt %, and then preparation of the coating liquid was completed. The coating liquid is a solution of titanium 2,2'-iminodiethoxide (complex of titanium-iminodiethanol). The molecular structure of titanium 2,2'-iminodiethoxide is shown in FIG. 5.

(ii) Forming a Metal Oxide Film on the Surface of a Glass Base Plate

On the surface of a soda glass base plate, an undercoating layer was formed. The type of the soda glass base plate and the undercoating layer are the same as the above-described (b) in Embodiment 1. Subsequently, the coating liquid prepared in the above-described (i) was applied according to the dip coat method so as to form a film. The lifting speed in the dip coat method was determined to be 8 mm/sec. Then, firing was performed in the atmospheric air. Temperature control during the firing was performed such that the temperature was increased from room temperature to 500° C. in 1 hour, maintained at 500° C. for 1 hour, and cooled down to room temperature in 1 hour.

Embodiment 3

(a) Forming Titanium Oxide Films on Surfaces of Glass Base Plates

On the surface of each base plate made of soda glass in the size of 150 mm×75 mm, an undercoating layer (alkali barrier layer) was formed. The undercoating layer was formed by a method wherein a commercially available undercoating liquid (Bistrator H (NDH-500A) produced by Nippon Soda Co., Ltd.), which is a high-temperature type photocatalytic undercoating liquid, was applied onto the surface of each base plate by the dip coat method, and then fired for 1 hour in atmospheric air. The lifting speed in the dip coat method was determined to be 8 mm/sec. Temperature control during the firing was performed such that the temperature was increased from room temperature to 500° C. in 1 hour, maintained at 500° C. for 1 hour, and cooled down to room temperature in 1 hour.

Subsequently, Coating Liquid A produced in the above-described Embodiment 1 was applied on the surface of each glass base plate, on which the undercoating layer was formed, by the dip coating method. The lifting speed in the dip coating method was determined to be 8 mm/sec. Then, clacination was performed at firing temperatures shown in Table 7.

TABLE 7

|  | Firing Temperature (° C.) | Contact angle (°) | | | | Hardness |
|---|---|---|---|---|---|---|
|  |  | Before UV irradiation | After 1-hour UV irradiation | After 2-hour UV irradiation | After 3-hour UV irradiation |  |
| Embodiment 3 | 250 | — | — | — | — | H |
|  | 300 | 51.4 | 24.0 | 7.3 | 6.5 | 3H |
|  | 350 | 47.2 | 6.0 | 5.4 | 4.6 | >9H |
| Comparative Example 3 | 250 | — | — | — | — | <6B |
|  | 300 | 15.6 | 5.8 | 5.0 | 4.9 | <6B |
|  | 350 | 17.7 | 5.9 | 5.0 | 4.9 | <6B |

Temperature control during the firing was performed such that the temperature was increased from room temperature to a predetermined firing temperature in 1 hour, maintained at the firing temperature for 24 hours, and cooled down to room temperature in 1 hour.

According to the procedure described above, titanium oxide film covered products 7 were completed, each of which includes, as shown in FIG. 1, a titanium oxide (TiO$_2$) film 5 formed on a soda glass base plate 1 so as to interpose an undercoating layer 3.

(b) Evaluation of Hydrophilic Property (Photocatalytic Action)

With respect only to the titanium oxide film covered products 7 which were fired at the firing temperatures of 300° C. and 350° C. among the titanium oxide film covered products 7 formed in the above-described (a), contact angles of water on the surfaces of titanium oxide films 5 were measured. The measurement was performed before UV irradiation, and after 1-hour, 2-hour, and 3-hour UV irradiation. A 40 W-BLB lamp was used for a light source. The conditions for UV irradiation were such that the UV intensity on a tested surface became 2.4 mW/cm$^2$ (at 365 nm). The measurement results are shown in Table 7.

As shown in Table 7, although all the contact angles before UV irradiation were 40° or larger, in a case wherein the firing temperature was 300° C. or higher, when the titanium oxide film 5 of the titanium oxide film covered product 7 was formed, the titanium oxide film 5 became such hydrophilic that the contact angle became 6.5° after 3-hour UV irradiation. In a case wherein the firing temperature was 350° C., when the titanium oxide film 5 of the titanium oxide film covered product 7 was formed, the titanium oxide film 5 became such hydrophilic that the contact angle became 6.0° after 1-hour UV irradiation, and 4.6° after 3-hour UV irradiation. The result shows that the titanium oxide film 5 is optically induced to become super-hydrophilic under the condition that the firing temperature is 300° C. or higher.

Additionally, other than the titanium oxide film covered products 7 for which the coating liquid prepared in the above-described Comparative Example 3 was used, an evaluation of hydrophilic property (photocatalytic action) was made with respect also to titanium oxide film covered products which were produced in the same manner as in Embodiment 6. The result is shown in Table 7.

(c) Evaluation of Hardness of Titanium Oxide Film

In regard to the titanium oxide film covered products 7 produced in the above-described (a), the hardness of the titanium oxide films 5 was evaluated. The conditions for hardness measurement were conformed to Pencil Scratch Test (JIS K 5400). The measurement results are shown in Table 7.

As shown in Table 7, even when the firing temperature was low, such as at 250° C. or 300° C., the values of the hardness became respectively H, and 3H which were relatively high values. When the firing temperature was 350° C., the value of the hardness was 9H and over, which was an extremely high value.

Furthermore other than the titanium oxide film covered products 7 for which the coating liquid prepared in the above-described Comparative Example 3 was used, an evaluation of film hardness was made with respect also to titanium oxide film covered products which were produced in the same manner as in Embodiment 6. The result is shown in Table 7. As shown in Table 7, even when the firing temperature was 350° C., the film hardness became 6B or lower.

It is to be noted that the present invention is not limited to the above-described embodiments, and that the present invention can be carried out in various ways without departing from the scope of the invention.

What is claimed is:

1. A coating liquid comprising organic metal complexes represented by Chemical Formula 1 in which each of $R^1$-$R^8$ being one of:

[Formula 1]

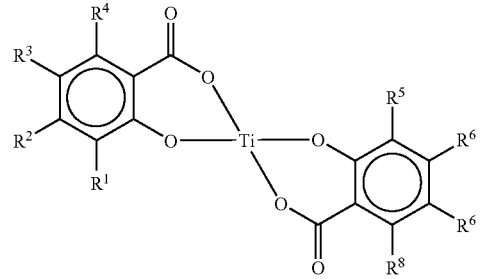

(1) a group represented by $C_nH_{2n+1}$ (said n being an integral number equal to or larger than 0);
(2) a group represented by $COOR^9$ (said $R^9$ being a group represented by $C_mH_{2m+1}$, and said m being an integral number equal to or larger than 0);
(3) a halogen atom; and
(4) CN or $NO_2$.

2. The coating liquid according to claim 1 wherein the organic metal complex is a titan-salicylic acid complex.

3. A method for forming a titanium oxide film comprising steps of:
applying the coating liquid, according to claim 1, on a base plate so as to form a film; and
changing the organic metal complex, included in the film, into titanium oxide.

4. The method for forming a titanium oxide film according to claim 3 wherein the step of changing the organic metal complex into titanium oxide is performed by firing.

5. The method for forming a titanium oxide film according to claim 4 wherein a temperature for the firing is equal to or higher than 300° C., and equal to or lower than a melting point of the base plate.

6. A titanium oxide film formed by the method for forming titanium oxide film according to claim 3.

7. A titanium oxide film covered product comprising:
a base plate; and
a titanium oxide film formed on a surface of the base plate by the method for forming a titanium oxide film according to claim 3.

8. The titanium oxide film covered product according to claim 7 wherein the base plate is made of glass.

* * * * *

UNITED STATES PATENT AND TRADEMARK OFFICE
CERTIFICATE OF CORRECTION

| | | |
|---|---|---|
| PATENT NO. | : 7,993,753 B2 | Page 1 of 1 |
| APPLICATION NO. | : 12/226826 | |
| DATED | : August 9, 2011 | |
| INVENTOR(S) | : Christopher Cordonier et al. | |

It is certified that error appears in the above-identified patent and that said Letters Patent is hereby corrected as shown below:

On the Title page
Item (57) Abstract
  Delete the "R6" that is between R6 and R8
  Insert --R7--

Col. 3, Line 33
  Delete "R6"
  Insert --R7--

Col. 16, Line 22
  Delete "R6"
  Insert --R7--

Signed and Sealed this
Fourth Day of December, 2012

David J. Kappos
*Director of the United States Patent and Trademark Office*